United States Patent [19]

Farin

[11] 4,241,041

[45] *Dec. 23, 1980

[54] METHODS FOR THE RECOVERY OF SULFUR COMPONENTS FROM FLUE GAS AND RECYCLE SODIUM SULFITE BY REDUCTION-SMELTING AND CARBONATING TO STRIP HYDROGEN SULFIDE

[75] Inventor: William G. Farin, Neenah, Wis.

[73] Assignee: MEI Systems Inc., Menasha, Wis.

[ * ] Notice: The portion of the term of this patent subsequent to Apr. 10, 1996, has been disclaimed.

[21] Appl. No.: 5,490

[22] Filed: Jan. 22, 1979

Related U.S. Application Data

[63] Continuation-in-part of Ser. No. 840,996, Oct. 11, 1977, Pat. No. 4,148,684, which is a continuation-in-part of Ser. No. 739,718, Nov. 8, 1976, abandoned.

[51] Int. Cl.$^3$ ............... C01B 17/00; C01B 17/16; D21C 11/02; D21C 11/12
[52] U.S. Cl. .................... 423/563; 423/427; 423/242; 162/30 K; 162/36; 423/DIG. 3
[58] Field of Search ........... 423/DIG. 3, 242 A, 563, 423/421, 427, 428; 162/30 K, 36

[56] References Cited

U.S. PATENT DOCUMENTS

| | | | |
|---|---|---|---|
| 2,656,245 | 10/1953 | Gray et al. | 423/DIG. 3 |
| 2,864,669 | 12/1958 | Ahlborg et al. | 423/DIG. 3 |
| 3,402,992 | 9/1968 | Ahlborg | 423/DIG. 3 |
| 3,508,863 | 4/1970 | Kimidki et al. | 423/DIG. 3 |
| 3,826,710 | 7/1974 | Anderson | 423/DIG. 3 |
| 4,049,787 | 9/1977 | Romantschuk et al. | 423/DIG. 3 |
| 4,083,930 | 4/1978 | Kohl et al. | 423/DIG. 3 |
| 4,141,961 | 2/1979 | Miller | 423/242 A |
| 4,148,684 | 4/1979 | Farin | 423/DIG. 3 |

*Primary Examiner*—O. R. Vertiz
*Assistant Examiner*—Gary P. Straub

[57] ABSTRACT

An improved method for recovering sulfur from flue gas which contains sulfur dioxide formed from burning sulfur containing fuels. The method first involves the reduction burning of auxilary fuel in the presence of sodium sulfite to convert it to smelt containing sodium sulfide and sodium carbonate. The smelt is dissolved, and the solution reacted with carbon dioxide, hydrogen sulfide and water vapor forming sodium hydrosulfide. The sodium hydrosulfide is reacted with a high concentration of recycled sodium bicarbonate and stripped with carbon dioxide to form sodium carbonate and release the sulfides as hydrogen sulfide from the stripper. The hydrogen sulfide released is then converted to sulfur dioxide, sulfuric acid or elemental sulfur. Pressurized carbon dioxide is used for pressure carbonation of recycled solution from the stripper to convert the sodium carbonate to the high concentration of recycled sodium bicarbonate used for stripping. The sodium carbonate and sodium bicarbonate from the stripper are reacted under pressure with sodium bisulfite in a decarbonator to form sodium sulfite and release carbon dioxide under pressure for use in the pressure carbonation. A portion of the sodium sulfite formed by decarbonation is then reduced in the smelter. The balance of the sodium sulfite is then used for absorption of the sulfur dioxide from the flue gas forming the sodium bisulfite used for decarbonation.

20 Claims, 2 Drawing Figures

METHODS FOR THE RECOVERY OF SULFUR COMPONENTS FROM FLUE GAS AND RECYCLE SODIUM SULFITE BY REDUCTION-SMELTING AND CARBONATING TO STRIP HYDROGEN SULFIDE

BACKGROUND OF THE INVENTION

This a continuation-in-part of copending application Ser. No. 840,996 filed Oct. 11, 1977, which issued as U.S. Pat. No. 4,148,684 on Apr. 10, 1979, entitled METHODS FOR RECOVERY AND RECYCLING OF CHEMICALS FROM SODIUM SULFITE AND SODIUM BISULFITE PULPING, which is a continuation-in-part of then copending application Ser. No. 739,718 filed Nov. 8, 1976 and now abandoned.

In the above-referenced copending applications, of which this is a continuation-in-part, there are described improved lower cost methods for the recovery and recycling of chemicals from sodium sulfite and sodium bisulfite pulping as employed in the pulp and paper industry.

It has now been found that in addition to treating spent cooking liquors used in the pulp and paper industry, the described methods may be applied equally well to the treatment of flue gas which contains recoverable quantities of sulfur dioxide generated when burning sulfur containing fuels. The system recovers the sulfur component and recycles the sodium sulfite and sodium carbonate used for sulfur dioxide scrubbing.

As indicated in the earlier applications, known methods of scrubbing sulfur dioxide from flue gas and the recovery and recycling of the pulping chemicals requires a high capital investment as well as high operating costs. The need for efficient scrubbing and separation of the sulfur component and the recycling of scrubbing chemicals becomes more important as the rules for environmental cleanup are more strictly enforced. This need is particularly urgent in areas other than pulping, such as coal-burning power plants and the like, where large quantities of sulfur dioxide are contained in the flue gas and there is no on-site use for the sulfur recovered.

A number of scrubbing systems are now used for this purpose. Most scrubbing systems do not provide means for separation of the sulfur component and recycling of the scrubbing chemicals. High installation and operating costs are encountered for the scrubbing chemical and the disposal of the sludge formed by the reaction of the scrubbing chemical with recovered sulfur dioxide. Other systems provide partial separation and recycling but the methods utilized are also very high in installation and operating costs.

One of the prior art systems is known as the Wellman-Lord process. This system uses a sodium sulfite solution to scrub the flue gas and form sodium bisulfite. The sodium bisulfite formed is then evaporated and crystallized in an evaporator crystallizer to release sulfur dioxide and recover the sodium sulfite used in scrubbing. This vacuum evaporation and crystallization is very expensive and has high steam requirements that reduce the effective capacity of the boiler generating the steam.

There is also a substantial amount of sodium sulfate formed in absorption due to the oxygen contained in the flue gas. This builds up in the Wellman-Lord process and a substantial amount of the chemicals must be purged and disposed of because of sodium sulfate and contained sodium sulfite can not be economically recovered by the process.

The percent of sulfur dioxide removal is also limited due to the required use of sodium sulfite for final scrubbing. Sodium sulfite has a lower pH than sodium carbonate and thus has less absorption efficiency than processes employing sodium carbonate for final absorption.

Sodium sulfite, sodium carbonate and sodium hydroxide are preferred scrubbing chemicals as they are soluble and minimize scaling or shutdown problems. However, these three chemicals are expensive and can not be utilized unless they can be recovered or there is some use for the sodium bisulfite or sodium sulfite product such as in a sodium sulfite pulping operation. These applications have limited requirements. The sodium sulfite or bisulfite also has a chemical oxygen demand and requires expensive secondary treatment if discharged in the plant effluent.

The most economical throw-away product is the calcium sulfite or calcium sulfate formed in utilizing lime or limestone for sulfur dioxide scrubbing. However, calcium sulfate has a reverse solubility and scales rapidly when a solution is heated. Scaling problems are quite severe in using calcium-containing solutions for scrubbing flue gas resulting in substantial downtime for scale removal. For power plant operations this downtime can not be tolerated.

Besides the chemical costs of the lime or limestone used for scrubbing there is also a high expenditure required for the disposal of large quantities of the calcium sulfite and calcium sulfate sludge produced that must ordinarily go to land fill. Calcium sulfite also presents an environmental problem as it has a chemical oxygen demand. Any leaching from the land fill to surrounding streams would lower the streams oxygen content. The added cost of oxidation of the calcium sulfite to calcium sulfate is often required to meet environmental requirements.

Other throw-away systems include a double alkaline process that uses sodium sulfite or sodium hydroxide for sulfur dioxide scrubbing forming sodium bisulfite. The sodium sulfite or sodium hydroxide is regenerated by mixing with lime to form calcium sulfite and calcium sulfate. The regenerated sodium sulfite or sodium hydroxide remains saturated with calcium sulfate and calcium sulfite and scaling is still encountered.

The double alkaline process has the same high chemical costs and disposal problems as the lime or limestone scrubbing system. The sodium sulfate formed in not recovered and some sodium is lost in the sludge disposal system.

Other systems utilize ammonia and magnesium base chemicals but these chemicals also have high chemical and disposal costs.

It is the purpose of this invention to provide a direct economical method of reduction-smelting sodium sulfite or sodium bisulfite and sodium sulfate to produce sodium sulfide, precarbonating and hydrogen sulfide stripping to recover the sulfur, carbonating and decarbonating to produce the sodium sulfite used to absorb the sulfur dioxide from flue gas forming sodium bisulfite. A portion of the sodium sulfite or sodium bisulfute may also be recycled to the original smelting step.

The methods covering sodium sulfite recovery from pulp mill waste liquors, which uses the sodium sulfite for flue gas scrubbing to recover the sulfur dioxide for reuse in preparing sodium sulfite cooking liquor were disclosed and described in copending U.S. application Ser. No. 840,996 now U.S. Pat. No. 4,148,684. This new disclosure covers the recovery of the sulfur dioxide from flue gas by sodium sulfite scrubbing and sodium carbonate scrubbing to recover elemental sulfur, sulfur dioxide or sulfuric acid while recycling the sodium sulfite and sodium carbonate using the pulp mill sodium sulfite recovery methods.

A process utilizing the heat in the flue gas for the evaporation requirements has been disclosed and described in U.S. Pat. No. 3,638,708 and Canadian Pat. No. 906,394. These methods can also be utilized to provide the evaporation requirements as described in this present disclosure.

SUMMARY OF INVENTION

In the application of which this is a continuation-in-part smelt was formed by burning spent pulping liquor containing sodium and sulfur as well as organics which contain carbon and which provide the fuel for combustion.

The smelt used to recover sulfur from the sulfur dioxide in the flue gas in accordance with this invention, is formed by burning an auxiliary fuel such as oil, gas, carbon, petro coke, wood, sawdust or pulverized coal in a reducing atmosphere in the presence of sodium sulfite or sodium bisulfite at the bottom of a smelter or a recovery boiler. The smelt is comprised primarily of sodium sulfide and sodium carbonate. In this operation, some sulfur is released from the smelter as sulfur dioxide but a large portion of the sulfur remains in the smelt in the form of sodium sulfide. The molten smelt which also contains sodium carbonate is drained to a smelt tank, mixed with water to provide a smelt solution and clarified to remove impurities.

The smelt solution containing sodium sulfide and sodium carbonate is formed and processed through some or all of the following steps to produce sulfur dioxide, elemental sulfur or sulfuric acid from the sulfide portion, to produce additional sodium sulfite and/or sodium bisulfite for smelting, to produce additional sodium sulfite and sodium carbonate for the absorption of sulfur dioxide from the flue gas while also recycling and consuming the sodium bisulfite formed in absorbing the sulfur dioxide.

This invention is particularly directed to the steps utilizing the sodium sulfite and sodium carbonate to absorb sulfur dioxide from flue gas forming sodium bisulfite, reduction-smelting sodium sulfite or sodium bisulfite with auxiliary fuel to form a smelt containing sodium sulfide and sodium carbonate, carbonating the smelt and stripping hydrogen sulfide to permit separation and recovery of the sulfur component and form sodium carbonate, combining sodium carbonate with sodium bisulfite to form sodium sulfite and recycling portions of the sodium sulfite and sodium carbonate for reuse in absorption. While twelve steps are listed for forming and treating the smelt and recycling sodium sulfite and sodium carbonate for flue gas treatment, many of the steps are optional depending on the results desired or end products required and are, therefore, separately claimed since they are not necessary to the basic method but offer considerable flexibility of choice as indicated in the detailed description.

1. In the smelting step, auxiliary fuel such as oil, gas, carbon, petro coke, wood, sawdust or pulverized coal is burned in a reducing atmosphere in the presence of concentrated sodium sulfite and/or sodium bisulfite to form a smelt containing sodium sulfide and sodium carbonate. The smelt is drained from the smelter, dissolved in water and the solution is clarified to remove impurities.

2. In a precarbonation step, the smelt solution from the smelting step containing sodium sulfide and sodium carbonate is contacted at the top of the precarbonation tower with a gas containing hydrogen sulfide and/or carbon dioxide causing the following reactions converting the sodium sulfide to sodium hydrosulfide:

$$Na_2S + H_2S = 2NaHS$$

$$2Na_2S + CO_2 + H_2O = Na_2CO_3 + 2NaHS$$

By venting the tower at the point where these reactions are essentially complete, the proportion of hydrogen sulfide and carbon dioxide consumed will be essentially the same as that vented from the tower. Below this point, carbon dioxide is also absorbed and consumed by the following reaction converting sodium carbonate to sodium bicarbonate:

$$Na_2CO_3 + CO_2 + H_2O = 2NaHCO_3$$

Over 65% of the sodium carbonate can be converted to sodium bicarbonate creating a demand for the carbon dioxide utilized in subsequent stripping operations. The hydrogen sulfide released is thus separated and concentrated for recovery of the sulfur component.

3. The hydrogen sulfide released from the precarbonation step may be oxidized to form sulfur dioxide, sulfuric acid or oleum. The sulfur dioxide, sulfuric acid or oleum produced may be used or marketed.

4. The hydrogen sulfide from the precarbonation step may be converted to elemental sulfur by processes such as the Claus reactor. The elemental sulfur may be used or marketed.

5. In a first desulfiding step, the solution from the precarbonation step is mixed with a recycled carbonated solution from a carbonation step containing a sufficiently high concentration of sodium bicarbonate to maintain the partial pressure of carbon dioxide and hydrogen sulfide created by the solution above that in the gas utilized for stripping in the desulfiding stripper. Under these conditions, both hydrogen sulfide and carbon dioxide are released in accordance with the following reactions:

$$NaHS + NaHCO_3 = Na_2CO_3 + H_2S$$

$$2NaHCO_3 = Na_2CO_3 + H_2O + CO_2$$

The sodium bicarbonate gives up its carbon dioxide very slowly so very little carbon dioxide is released. The reaction releasing hydrogen sulfide is rapid so the gas released can be about 95% hydrogen sulfide. The hydrogen sulfide reaction consumes both the sodium hydrosulfide and the sodium bicarbonate so the partial pressures of both hydrogen sulfide and carbon dioxide created by the solution are reduced by this reaction. As hydrogen sulfide is released, the concentration of hydrogen sulfide in the stripping gas contacted decreases and the concentration of carbon dioxide in the gas increases as the solution drops toward the bottom of the tower. To accelerate the reaction, water vapor is used in conjunction with the carbon dioxide for stripping, decreasing the partial pressures of the gases and increasing the temperature of the solution by condensation.

The higher temperature increases the partial pressures of the carbon dioxide and hydrogen sulfide created by the solution to facilitate the reaction. The stripped hydrogen sulfide and carbon dioxide utilized for stripping are discharged for use in the precarbonation step.

6. In a pressure carbonation step, all or a portion of the solution from the first desulfiding step containing sodium carbonate and sodium bicarbonate is pressure carbonated utilizing carbon dioxide at pressures above 1.2 atmospheres from a pressure decarbonation step to provide a high concentration of sodium bicarbonate in accordance with the following reaction:

$$Na_2CO_3 + CO_2 + H_2O = 2NaHCO_3$$

All or a portion of the carbonated solution is mixed with the product from the precarbonation step and recycled back to the top of the first desulfiding stripper.

7. In a second desulfiding step, a portion of the product from the first desulfiding step or a portion of the product from the carbonation step, or a combination thereof is sent to the second desulfiding stripper where it is heated to the 90° C. to 100° C. temperature range and stripped with carbon dioxide and water vapor that is discharged with stripped hydrogen sulfide and utilized for the stripping in the first desulfiding stripper. Here again, the partial pressures of carbon dioxide and hydrogen sulfide created by the solution are held above that in the gas by the high concentration of sodium bicarbonate contained in the solution. Both hydrogen sulfide and carbon dioxide are released but the amount of carbon dioxide released is limited by the slow rate of reaction. Due to the faster reaction, the hydrogen sulfide is preferentially released depleting all the sodium hydrosulfide contained with the remaining traces of hydrogen sulfide stripped with the carbon dioxide and the water vapor utilized for heating both the second and the first desulfiding strippers. A portion of the solution containing a high concentration of sodium bicarbonate as well as sodium carbonate is discharged to a decarbonation step and the balance, if required, to a decomposition step.

8. In a decomposition step a portion of the solution from the second desulfiding stripper is heated under pressure to the 100° C. to 250° C. range to decompose the sodium bicarbonate and release carbon dioxide in accordance with the following reaction:

$$2NaHCO_3 = Na_2CO_3 + H_2O + CO_2$$

This solution is vented releasing carbon dioxide and water vapor that is utilized for the heating in the decarbonation step or in the first or second desulfiding step. The sodium carbonate solution produced can be used for the final flue gas sulfur dioxide absorption stage to increase absorption efficiency.

9. In a decarbonation step a portion or all the solution from the first or second desulfiding stripper containing sodium carbonate and sodium bicarbonate along with a portion of any makeup sodium carbonate required is mixed with a circulating solution containing primarily sodium bisulfite from the absorption step to form sodium sulfite and release carbon dioxide by the following reaction:

$$Na_2CO_3 + 2NaHSO_3 = 2Na_2SO_3 + H_2O + CO_2$$

The sodium bicarbonate also decomposes releasing carbon dioxide. The reaction is carried out at pressures above 1.2 atmospheres, releasing carbon dioxide at a pressure above 1.2 atmospheres for use in the carbonation step. This solution can then be discharged to a flash tank vented at one atmosphere with the carbon dioxide and water vapor released utilized in the first or second desulfiding step.

10. In an evaporation step a portion of the sodium sulfite solution formed in decarbonation, not used for absorption, or a portion of the sodium bisulfite formed in absorption may be concentrated utilizing the heat in the flue gas from the smelter or from the boiler by (1) direct contact evaporation, (2) heat recovery vacuum evaporation, (3) heat recovery air evaporation, conventional evaporation methods or any combination to concentrate the sodium sulfite and/or sodium bisulfite solution for smelting.

11. In a first absorption step the flue gas containing sulfur dioxide is scrubbed in an absorber with a sodium sulfite solution supplied from the decarbonation step, producing sodium bisulfite in accordance with the following reaction:

$$Na_2SO_3 + SO_2 + H_2O = 2NaHSO_3$$

A portion of the sodium bisulfite solution formed in the absorber is recycled back for use in the decarbonation step and a portion may be concentrated in an evaporator and processed in a smelting operation.

12. In a final absorption step sodium carbonate from a decomposition step or from a desulfiding step may be used to lower the concentration of the sulfur dioxide discharged with the flue gas as covered by the following reaction:

$$Na_2CO_3 + SO_2 = Na_2SO_3 + CO_2$$

The sodium sulfite formed is then used in the preceding first absorption step.

The invention provides more complete and efficient carbonation using pure pressurized carbon dioxide supplied by new methods of pressurized decarbonation. It provides new methods of more efficient stripping of hydrogen sulfide by controlling the partial pressure of carbon dioxide and hydrogen sulfide created by the solution above that in the gas contacted by recycling the high concentrations of sodium bicarbonate made possible by pressure carbonation. This prevents carbonation and the resulting crystallization and scaling in the stripper. The improved stripping efficiency prevents sulfides from entering the decarbonation stages where contact with sodium bisulfite would produce sodium thiosulfate. It enables efficient conversion of the sulfur to sulfuric acid or elemental sulfur. New methods are also provided for the recovery of carbon dioxide from sodium bicarbonate solutions using heat decomposition with full heat utilization by using the vented carbon dioxide and water vapor for decarbonation and/or desulfiding. The invention recycles sodium sulfite for the main scrubbing requirements and can also recycle sodium carbonate for final scrubbing at a higher pH to improve the degree of sulfur dioxide removal from flue gas. It also provides new methods of reduction smelting of sodium sulfite or sodium bisulfite using auxilary fuels that also enables reduction and recovery of the sodium sulfate and sodium thiosulfate that would otherwise build up in the recovery system.

Other additional advantages of the invention will become apparent to persons skilled in the art on referring to the following detailed specifications and accompanying drawings.

DETAILED DESCRIPTION OF THE PREFERRED EMBODIMENTS

Figure 1:
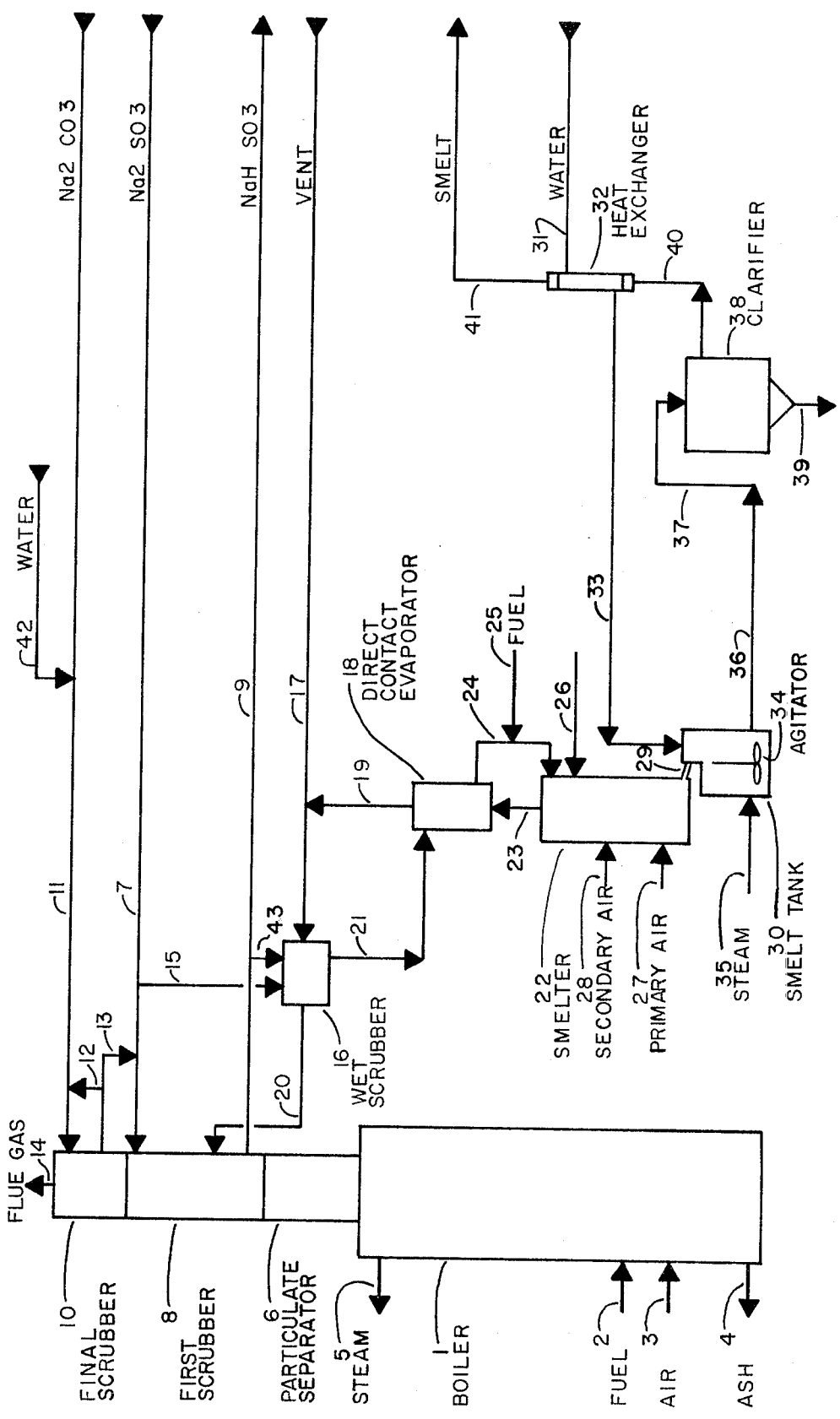
FIG. 1 is a schematic flow diagram showing a boiler producing steam in combination with flue gas scrubbing and sodium sulfite smelting, as well as recovering and clarifying smelt.

In the arrangement shown in FIG. 1 for a 500 megawatt boiler 1, 490,000 pounds per hour of 3% sulfur coal enters fuel inlet line 2. Combustion requires 5,460,000 pounds per hour of air supplied through inlet line 3 and produces 42,000 pounds per hour of ash discharged through outlet 4 and 5,000,000 pounds per hour of steam discharged through line 5.

Combustion generates 5,670,000 pounds per hour of flue gas containing 29,430 pounds per hour of sulfur dioxide that passes through particulate separator 6 and is scrubbed with sodium sulfite solution entering through line 7 in first scrubber 8. 26,595 pounds of sulfur dioxide are removed forming a sodium bisulfite solution that is discharged through line 9.

The flue gas still containing 2835 pounds per hour of sulfur dioxide passes to the final scrubber 10 and is scrubbed with a sodium carbonate solution supplied through line 11 and sodium sulfite circulated through line 12. The sodium sulfite produced is discharged through line 13 to line 7 to the first scrubber 8. The final scrubber 10 removes 2268 pounds per hour of sulfur dioxide and the flue gas is discharged through line 14 with the sulfur dioxide content reduced to 567 pounds per hour.

A portion of the sodium sulfite solution entering through line 7 passes through line 15 and is used for particulate scrubbing in wet scrubber 16 of the vent from the sulfuric acid or the elemental sulfur recovery systems entering through line 17 and the direct contact evaporator 18, venting through lines 19 and 17. The wet scrubber vents through line 20 to the first scrubber 8 for sulfur dioxide absorption.

The sodium sulfite solution containing sodium bisulfite formed by sulfur dioxide absorption and the collected particulate is discharged through line 21 to the direct contact evaporator where it contacts hot flue gas at 900° C. from the smelter 22, supplied through line 23. The sodium sulfite and sodium bisulfite solution is concentrated to 55% and discharged through line 24 to the smelter 22.

Fuel containing carbon is added through line 25 to the sodium sulfite and sodium bisulfite solution or directly to the smelter through line 26. Sodium bisulfite is decomposed to sodium sulfite releasing sulfur dioxide. Sodium sulfite and some fuel drops to the bottom of the smelter and a limited amount of air for combustion is supplied through primary air inlet 27 to maintain reducing conditions in the bottom of the smelter to convert the sodium sulfite to about 70% sodium sulfide, 20% sodium carbonate, 8% sodium sulfate and 2% sodium thiosulfate.

Final combustion is obtained higher in the smelter where hydrogen sulfide formed in reduction is oxidized to sulfur dioxide by secondary air supplied through inlet 28. Some sulfur dioxide is released from the sodium sulfite and sodium bisulfite contained and is vented with the flue gas through discharge 23.

Molten smelt, 50,200 pounds per hour, is discharged through smelt spout 29 to smelt tank 30. Water entering through line 31 is heated in indirect heat exchanger 32 and supplied through line 33 to the smelt tank where it is mixed with the smelt by agitator 34 to a 15% solution. Steam is added through line 35 to maintain a 90° C. temperature.

The smelt solution is discharged through lines 36 and 37 to clarifier 38 where impurities such as fly ash and calcium sulfate are settled out and removed through line 39. The smelt solution is then discharged through line 40, cooled in heat exchanger 32 to 40° C. and discharged through line 41. Dilution water through line 42 can be added to the sodium carbonate solution in line 11, to control the concentration of sodium carbonate and sodium sulfite solutions.

As an alternate a portion of the sodium bisulfite from line 9 can be supplied through line 43 to the wet scrubber 16 and utilized for smelting rather than the sodium sulfite supplied through line 15.

Figure 2:
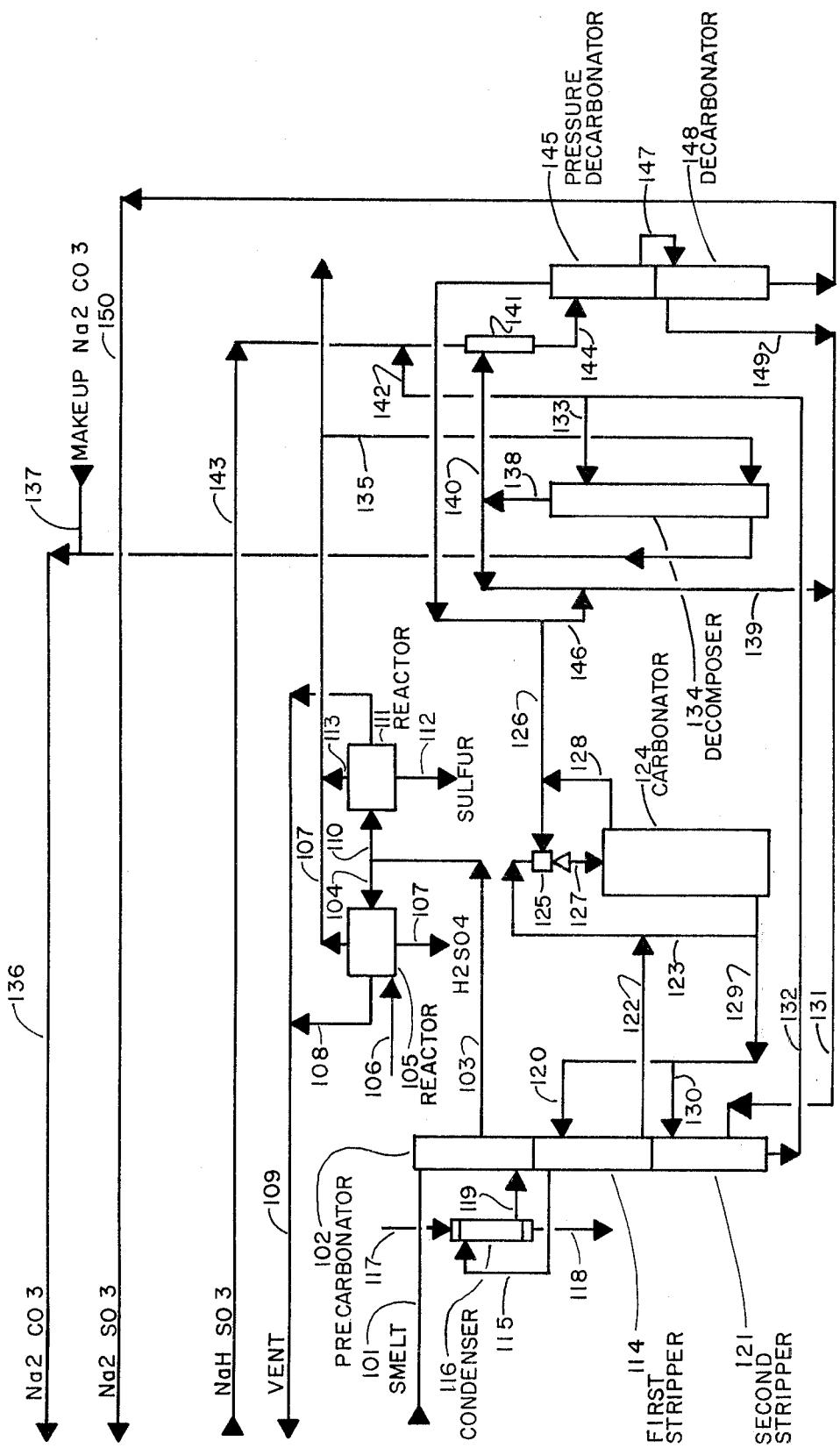
FIG. 2 is a schematic flow diagram showing smelt precarbonation, stripping, carbonation, decomposition and decarbonation to recover sulfur and provide sodium sulfite and sodium carbonate for scrubbing.

In the arrangement for a 500 megawatt boiler shown in FIG. 2 the smelt solution from line 41 FIG. 1 enters through line 101 to the precarbonator 102 operating at slightly above atmospheric pressure. In the top of the precarbonator the smelt solution absorbs both hydrogen sulfide and carbon dioxide converting the sodium sulfide to sodium hydrosulfide and sodium carbonate. In the bottom of the percarbonator carbon dioxide is absorbed converting 60% of the sodium carbonate to sodium bicarbonate.

15,333 Pounds per hour of hydrogen sulfide and 5,111 pounds per hour of carbon dioxide are vented through line 103 from the precarbonator. A portion or all the hydrogen sulfide can pass through line 104 to reactor 105 and be oxidized by oxygen and water entering line 106 to produce the sulfuric acid discharged through line 107 for marketing. 91,500 pounds per hour of steam are produced and discharged through line 107. The system can vent through lines 108 and 109 to FIG. 1 line 17 and wet scrubber 16 for particulate removal and through line 20 and first scrubber 8 for sulfur dioxide absorption.

A portion or all the hydrogen sulfide can also go through line 110 to reactor 111 to form elemental sulfur discharged through line 112. Steam can also be produced and discharged through lines 113 and 107. The reactor vents through lines 109 to line 17 and the wet scrubber 16 shown in FIG. 1 and through line 20 to first scrubber 8.

Hydrogen sulfide, carbon dioxide and water vapor are vented from the first stripper 114 at 85° C. through line 115. The gas is cooled to 40° C. and water vapor is condensed in an indirect condenser 116 by cooling water entering through line 117 and discharging through line 118. The cooled gas is discharged through line 119 to precarbonator 102 with a portion used for precarbonation and the balance vented through line 103.

The condensed water discharged with the gas through line 119 mixes the precarbonated smelt solution which contains sodium hydrosulfide, sodium carbonate and sodium bicarbonate. This solution drops into the first stripper 114 where it is mixed with a recycled solution of 10 times the precarbonated solution volume supplied through line 120 wherein 84% of the carbonated sodium is sodium bicarbonate.

At the 85° C. temperature and pressure slightly above atmospheric the partial pressure of carbon dioxide created by the solution is far above that provided by the carbon dioxide in the gas. The sodium bicarbonate decomposes very slowly to release a relatively small amount of carbon dioxide. The sodium bicarbonate also reacts rapidly with the sodium hydrosulfide contained in the precarbonated smelt forming sodium carbonate and releasing hydrogen sulfide. Because of the faster reaction the sodium bicarbonate is consumed in releasing about 20 times as much hydrogen sulfide as carbon dioxide.

In the first stripper 114, the mixed solution is stripped with carbon dioxide and water vapor from the second stripper 121. This reduces the partial pressure of the hydrogen sulfide released during stripping to a minimum to facilitate its release. The stripped solution containing sodium carbonate, sodium bicarbonate and some sodium hydrosulfide is discharged through line 122 and enters circulating line 123 from the carbonator 124 going to ejector 125. The solution provides the motivating force to circulate carbon dioxide from line 126 supplied at 3.5 atmospheres pressure that is mixed with the solution and discharged to the carbonator 124 through line 127. Excess carbon dioxide is recycled back to the ejector through lines 128 and 126.

The pressurized carbon dioxide carbonates the recycled solution to provide a solution with 84% of the carbonated sodium converted to sodium bicarbonate. The carbonated solution is circulated through lines 129 and 123 to ejector 125 and through lines 129 and 120 back to the first stripper 114. A portion of the carbonated product is also discharged through lines 129 and 130 to the second stripper 121.

In the second stripper operating at slightly above one atmosphere of pressure the solution is heated to 95° C. and stripped with carbon dioxide and water vapor entering through line 131 to minimize the partial pressure of the hydrogen sulfide gas released. The remaining sodium hydrosulfide in the solution is reacted to form sodium carbonate and the stripped solution containing sodium carbonate and sodium bicarbonate is discharged through line 132.

A portion of the stripped solution can pass through line 133 to the decomposer 134 where it is held for 30 minutes and stripped with steam supplied through lines 107 and 135 to the bottom of the decomposer. The pressure is held at 3.5 atmospheres and the temperature increased to 138° C. The sodium bicarbonate is gradually decomposed and the sodium carbonate solution is discharged through line 136 and used in the final scrubber 10 in FIG. 1 entering through line 11. Makeup sodium carbonate or sodium hydroxide can also be used entering through line 137.

The released carbon dioxide and water vapor discharges through line 138 and a portion can pass through line 139 and 131 for use in heating and stripping in the second stripper 121. A portion can also discharge through line 140 for heating in mixer 141.

A portion of the stripped solution from line 132 passes through line 142 and is mixed with the sodium bisulfite solution discharged from the first scrubber 8 in FIG. 1 through line 9 and supplied through line 143 to mixer 141. The mixed solution heated above 100° C. is discharged through line 144 to pressure decarbonator 145.

The sodium bicarbonate decomposes to sodium carbonate and the sodium carbonate reacts with the sodium bisulfite to form sodium sulfite releasing carbon dioxide at 3.5 atmospheres pressure through line 126 for use in ejector 125. Excess carbon dioxide is discharged through line 146, 139 and 131 to secondary stripper 121.

The sodium sulfite solution is discharged through line 147 to decarbonator 148 to release the balance of the carbon dioxide and water vapor at slightly above atmospheric pressure through lines 149 and 131 for use in second stripper 121. The sodium sulfite solution is then discharged through line 150 entering through line 7 in FIG. 1 with a portion used in the first scrubber 8 and the balance sent through line 15 to wet scrubber 16.

The smelt composition from the smelter can be varied by controlling the temperature in the reduction zone at the bottom of the smelter in the 800° C. to 950° C. range. At the lower temperatures sodium sulfite or sodium sulfate is first reduced to sodium sulfide, then converted to sodium carbonate releasing hydrogen sulfide. The hydrogen sulfide is then oxidized to sulfur dioxide by the excess secondary air in the oxidizing zone at the top of the smelter. Sufficient sodium carbonate can be formed in the smelt to provide the carbon dioxide needed for carbonation with an excess of sodium carbonate that can be used for final sulfur dioxide scrubbing of the flue gas.

A sodium sulfite scrubbing solution can remove most of the sulfur dioxide from flue gas, however with a pH of 8 its efficiency is limited. Sodium carbonate with a pH of 11 may be used to raise the pH of the scrubbing solution and this enables an improvement in sulfur dioxide recovery efficiency. This is a distinct improvement provided by this invention over other methods.

Sodium carbonate may be be used in the final stage to increase the pH as required to obtain desired removal efficiency. The product can be sodium sulfite or can still contain sodium carbonate and can be used in the scrubbing chemical of the preceeding stage or mixed with recycled sodium sulfite solution for scrubbing as shown in FIG. 1.

The sodium sulfite from the decarbonator can also be used for multistage scrubbing with 1 to 5 stages utilized, each having its own circulating system. The sodium sulfite is used in the stage preceeding sodium carbonate scrubbing and the product from each stage is fed to the preceeding stage. The final product from the first stage is highest in sodium bisulfite content and is then used for decarbonation.

Using sodium carbonate for final stage scrubbing allows flexibility in decarbonation. It permits the sodium bisulfite from the scrubber to decarbonation to have a 0–40% sodium sulfite content. The sodium sulfite from decarbonation to the scrubber can also have a 0–40% sodium bisulfite content. This allows decarbonation at a pH as high as 7.5 and decreases the temperature requirements for complete release of the carbon dioxide in decarbonation to the 65° to 100° C. range. This substantially reduces or eliminates steam heating requirements for heating the solution for decarbonation.

The efficiency of absorption of sulfur dioxide improves as the temperature is decreased. Scrubbing with a sodium sulfite solution only may require cooling to obtain necessary sulfur dioxide removal. The final scrubbing with a sodium carbonate solution however, removes these temperature restrictions and enables scrubbing the flue gas within the 60° to 95° C. discharge temperature range without cooling requirements. This also permits absorption and decarbonation at the same temperature so heating or cooling can be minimized or eliminated in the sodium sulfite, sodium bisulfite circulating system between the absorber and the decarbonator.

The absorption tower can be a single stage plate or packed tower using sodium sulfite for scrubbing, a two stage tower using sodium carbonate for final stage scrubber or a multiple stage scrubber using two or more sodium carbonate and/or two or more sodium sulfite scrubbing stages. Heat exchanges can be provided in the circulating systems for cooling or for heat recovery. The scrubbing temperatures can range from 35° C. to 100° C.

The absorption and decarbonation system can produce either an excess of sodium sulfite or an excess of sodium bisulfite. The excess of sodium sulfite or sodium bisulfite is removed and can be used in a wet scrubber for particulate removal from flue gas from the smelter and from the sulfur recovery process. The scrubber can be high a velocity venturi or ionization may be utilized to provide particulate removal with minimum pressure drop. The particulate scrubber vents to the flue gas absorber or scrubber for removal and recovery of vented sulfur dioxide. The sulfur dioxide can also be removed by a separate scrubber using recovered sodium sulfite and/or sodium carbonate.

The concentration of the sodium sulfite solution from decarbonator should be held on the high side of the 15 to 22% range to minimize the evaporation requirements for smelting.

The dilution for absorption follows the takeoff to the wet scrubber as shown in FIG. 1. The solution from the wet scrubber can be direct contact evaporated using the flue gas from the smelter, increasing the concentration to 55% for smelting in a refractory lined smelter.

The heat in the flue gas from the smelter can also be used for steam production. In this case the direct contact evaporator may not provide sufficient evaporation. Heat can be removed from the absorption system by adding heat exchangers to a scrubber circulating system. One can be added in FIG. 1, line 12 to remove heat from the final scrubber 10. One can also be added to line 7 to remove heat from the first scrubber 8. Either heat exchanger can be used to heat a circulating flow of sodium sulfite solution with the heat utilized for either vacuum evaporation, air evaporation or both. These methods are described in U.S. Pat. No. 3,638,708 and Canadian Pat. No. 906,394. Final evaporation can be carried out in the direct contact evaporator using the flue gas from the smelter.

The concentrated sodium sulfite or sodium bisulfite solution can be mixed with an auxilary fuel containing carbon such as oil or sprayed into the smelter with the auxilary fuel such as gas, carbon, petroleum coke, wood, sawdust or pulverized coal fired seperately. A low ash fuel is preferred to avoid ash buildup problems. Initial burning and evaporation takes place in the oxidation section where the sodium sulfite is concentrated and secondary air is provided for fuel oxidation. Sodium sulfite and carbon particles drop to the bottom of the smelter and form a smelt bed. A limited amount of heated primary air is used in the bottom of the smelter for reduction burning to convert sodium sulfite or sodium sulfate to sodium sulfide and sodium carbonate. Some by-product sodium sulfate and sodium thiosulfate are produced and will circulate through the system. However, the smelting operation also reduces the sodium sulfate and sodium thiosulfate so no buildup is encountered in the system.

The reduction of sodium sulfite is smelting to sodium sulfide and sodium carbonate and the evaporation requires composition temperatures above 800° C. in the oxidation section with 32,000 BTU per pound of sulfur required. 40% of this heat can be utilized to produce steam or the heat may be used directly for evaporation requirements. A refractory lined smelter is used when all the flue heat is used directly for evaporation. A water walled smelter or a tubular economizer can convert this excess heat to steam.

The molten smelt discharged from the smelter at 800° C. is dissolved in hot water in a conventional smelt tank. The solution is heated to 90° C. to facilitate clarification. The clarifier provides an excellent means of removing impurities such as fly ash and the calcium sulfate that otherwise causes scale problems in most sulfur dioxide scrubbing systems. The smelt solution is then cooled by the dilution water going to the smelt tank before precarbonation.

The partial pressure characteristics of carbon dioxide and hydrogen sulfide are utilized to full advantage in the precarbonation, hydrogen sulfide stripping and carbonation systems provided. The partial pressure of carbon dioxide created by a carbonated smelt solution in atmopsheres may be expressed by the formula:

$$pCO2 = \frac{X^2 C^{1.29}}{10S(1-X)(185-t)}$$

X is the sodium contained as sodium bicarbonate divided by the total carbonated sodium.
C is the sodium normality.
S is the solubility of carbon dioxide in the water contained in gram moles per liter.
t is the temperature in degrees centigrade.
A simplified formula may be expressed by:

$$pCO2 = \frac{(NaHCO3)^2 \times F1}{Na2CO3}$$

The carbon dioxide partial pressure created by the solution increased by the square of the sodium bicarbonate content and by the reciprocal of the sodium carbonate content. The factor F1 increases with sodium normality and temperature also increasing the partial pressure of carbon dioxide created by the solution.

The carbon dioxide partial pressure created by the solution can be held substantially above that of the gas in contact with it with only a very slow release of carbon dioxide by maintaining a high sodium bicarbonate content. This phenomenon is used in the subject invention for desulfiding by stripping with carbon dioxide without carbonation.

The partial pressure of hydrogen sulfide in atmospheres created by the smelt solution may be expressed by the formula:

$$pH2S = \frac{(NaHS) \times (NaHCO3) \times F2}{Na2CO3}$$

The partial pressure of hydrogen sulfide created by the solution increases with sodium hydrosulfide content, sodium bicarbonate content and by the reciprocal of the sodium carbonate content. The factor $F_2$ increased with temperature also increasing the partial pressure of hydrogen sulfide created by the solution.

In the initial reaction in the precarbonation stage, both carbon dioxide and hydrogen sulfide are absorbed converting the sodium sulfide to sodium hydrosulfide. By themselves these reactions without carbonation create no solution partial pressures for either carbon dioxide or hydrogen sulfide unless sodium bicarbonate is also formed. The second stage of precarbonation and carbonation by carbon dioxide absorption converts sodium carbonate to sodium bicarbonate and increases the partial pressure of both carbon dioxide and hydrogen sulfide created by the solution. In this second precarbonation stage, a low carbon dioxide gas percentage or a low carbon dioxide partial pressure can be used as there is very low partial pressure created by the solution due to the low sodium bicarbonate content. This permits large quantities of carbon dioxide to be used for stripping hydrogen sulfide in a stripper with the hydrogen sulfide, carbon dioxide mixture then used for precarbonation where the absorption of carbon dioxide concentrates the hydrogen sulfide before it is vented.

The initial precarbonation reaction can also be carried out in a preliminary precarbonation stage using a portion of the flue gas containing carbon dioxide such as that discharged in line 14 of FIG. 1. Using this flue gas for the initial reaction converting the sodium sulfide to equal molecular parts of sodium hydrosulfide and sodium carbonate in a preliminary precarbonation increases the sodium carbonate content in the smelt. This increases the sodium carbonate content available for carbon dioxide generation and also the sodium carbonate available for final scrubbing.

If the amount of flue gas used for this preliminary precarbonation reaction is not limited and too high a quantity of carbon dioxide is absorbed, the second reaction converting sodium carbonate to sodium bicarbonate occurs. The sodium bicarbonate formed and the sodium hydrosulfide contained create a partial pressure of hydrogen sulfide in the solution and hydrogen sulfide is released to the atmosphere with the flue gas. To avoid this release the amount of flue gas used must be limited.

Where large quantities of sodium carbonate are not required, the initial precarbonation reaction can be carried out in the precarbonation as shown in FIG. 1 without any danger of releasing hydrogen sulfide to the atmosphere.

Precarbonation can be carried out in a circulating reactor, mixer, plate or packed countercurrent tower. The preferred embodiment is a countercurrent tower wherein the smelt solution at temperatures in the 30° C. to 60° C. range enter the top of the tower and contact a hydrogen sulfide, carbon dioxide gas mixture to form sodium hydrosulfide. The hydrogen sulfide vented can contain 10% to 40% carbon dioxide and be processed to form elemental sulfur or sulfuric acid.

From 40% to 75% of the sodium carbonate contained in the smelt solution being precarbonated, can be converted to sodium bicarbonate using the carbon dioxide from subsequent stripping with the carbon dioxide concentration reduced from 50% range to the 25% range in the hydrogen sulfide vented from the precarbonator. The vapors used for precarbonation can be cooled to condense out the water vapor and reduce the temperature in the precarbonator as shown in FIG. 1. Intermediate cooling can also be used in the tower to increase the degree of carbonation possible. Some hydrogen sulfide may be released in precarbonation, however sodium bicarbonate formation should be limited to its solubility range to avoid crystallization in the precarbonator.

In prior art patents where sodium bicarbonate has been contained or recycled to facilitate desulfiding by contacting with carbon dioxide, the sodium carbonate has been formed by flue gas or with carbon dioxide at partial pressures of only a fraction of one atmosphere as compared to pressure in excess of 1.2 atmospheres used in the precarbonation stage of the subject invention. The hydrogen sulfide partial pressure created by the solution increases directly with the sodium bicarbonate content, however sodium bicarbonate is consumed by the desulfiding reaction causing a reduction in the hydrogen sulfide partial pressure. It is also reduced by increasing the sodium carbonate content and sodium carbonate is formed by the desulfiding reaction.

Under these conditions when the sodium bicarbonate is produced at partial pressures below one atmosphere there is not sufficient sodium bicarbonate produced in the solution to complete the desulfiding reaction. For this reason prior art patents carry out the desulfiding in carbonation towers where carbon dioxide must be absorbed to replace the sodium bicarbonate consumed and increase the partial pressure of hydrogen sulfide sufficiently for release. Absorption temperature must be retained low to facilitate absorption which is detrimental to hydrogen sulfide stripping and the sodium bicarbonate formed under these conditions crystallizes causing scaling or plugging problems.

Where carbon dioxide partial pressures above one atmosphere have been utilized for carbonation in prior art patents, desulfiding has either been carried out in the same tower as carbonation or the product containing high concentrations of sodium bicarbonate has required very expensive vacuum evaporation to release the hydrogen sulfide. Neither method provides complete desulfiding.

In the subject invention, the solution is stripped with carbon dioxide in the first stripper without carbonation with 65 to 100% of the stripped solution going through separate carbonation. Carbonation can take place with pure carbon dioxide at pressure above 1.2 atmospheres to provide sufficient conversion of sodium carbonate to sodium bicarbonate to complete the desulfiding reaction when mixed with the precarbonated smelt. From 3 to 20 times as much carbonated product is recycled as the precarbonated solution mixed with it and sent to the top of the first stripper. The carbonated solution is also heated to the 65° to 100° C. range in the stripper. These conditions provide the mixed solution with the partial pressures of both carbon dioxide and hydrogen sulfide created by the solutions maintained well above those provided by the gases used for stripping causing both hydrogen sulfide and carbon dioxide to be released from the solution. The reaction releasing the hydrogen sulfide is much more rapid than the slow reaction releasing carbon dioxide and the gas released will be from 90% to 98% hydrogen sulfide. Reaction time is also limited and the carbon dioxide partial pressure created by the solution is never lowered to that provided by the gas due to the phenomenon of the extremely slow release of carbon dioxide.

Stripping is preferably carried out in a countercurrent packed tower. Both carbon dioxide and water vapor are used for stripping. The water vapor heats the solution to 65° C. to 100° C. range increasing the solution partial pressures and the water vapor partial pressures in the gas thereby reducing the gas partial pressures of the hydrogen sulfide and carbon dioxide. The hydrogen sulfide content in the gas can be reduced essentially to zero at the bottom of the tower if sufficient sodium bicarbonate at sufficiently high concentration is circulated. This maintains the partial pressures of hydrogen sulfide as well as carbon dioxide created by the solution above that in the gas to assure complete removal of the sulfides and prevent carbonation or any sodium bicarbonate formation in the stripper. The hydrogen sulfide and carbon dioxide released from the stripper are preferably cooled in a condenser to the 40° C. range before being used for precarbonation.

To provide a carbonated solution with the high sodium bicarbonate content needed to prevent carbonation during stripping, carbonation is carried out using carbon dioxide at pressures above 1.2 atmospheres provided by the decarbonation step. While carbonation can be carried out in a countercurrent tower, the preferred embodiment for the present invention is the single stage pressure carbonator with liquor circulated through an ejector that circulates and mixes carbon dioxide with the circulated solution as shown in FIG. 2. This permits single stage carbonation with carbon dioxide recycled to permit complete utilization and efficient formation of the high concentration of sodium bicarbonate required.

Where high sodium bicarbonate concentrations are used in carbonation and crystallization occurs, scale control methods can be used in the carbonation. However, operation can be carried out at reduced concentration or sufficiently high temperature to avoid crystallization. A portion or all of this carbonated solution is then mixed with the precarbonated solution and fed to the first desulfiding stripper. A portion of the product from the first desulfiding stripper or a portion of the product from carbonation or a combination thereof can be used as the product going to the second desulfiding stripper, or a portion can go to the decomposer for decomposition, and the balance used directly in the decarbonation step.

The efficiency of desulfiding increases as the temperature is increased making operation in the upper end of the 65° C. to 100° C. range desireable. There is a practical limitation on the stripping temperature however, as the high temperatures increase heating and condensing requirements. These heating requirements are substantially reduced and a heat exchanger in the circulating lines between the stripper and carbonator can be eliminated if carbonation occurs at essentially the same temperature as stripping.

The carbonation pressure requirements are lowest at low temperatures and 90% conversion of carbonated sodium bicarbonate is easily achieved at 50° C. At the higher temperatures the carbon dioxide pressure requirements to achieve this conversion become excessive. However, due to the increased efficiency of stripping at higher temperature, it has been found that the conversion requirement of carbonated sodium to sodium bicarbonated can be lowered to as low as 75% and complete stripping can still be achieved by increasing the circulation rates so that the resulting circulating solution is at least six times the amount of precarbonated solution being reacted. This permits carbonation to be carried out in the same 60° C. to 100° C. range as desulfiding. Crystallization in carbonation can also be minimized or eliminated at the elevated temperature.

The efficiency of desulfiding can also be improved at lower temperatures by desulfiding at lower pressures. This would require the use of a vacuum pump to handle the vent from the strippers after the condenser in FIG. 1, line 119, or the vent from the precarbonator in line 103. This would allow both the stripper and carbonator to operate at the same lower temperatures with low heat requirements but would require an expensive vacuum pump handling hydrogen sulfide. Operating at the higher temperatures avoids this requirement as well as the crystallization problems that are encountered at lower temperatures.

Although substantially complete removal of the sulfides can be carried out in the first desulfiding stripper, the circulation requirements, heating requirements and carbonation requirements are reduced considerably by adding a second desulfiding stripper. The sodium bicarbonate content in the feed to the second desulfiding stripper can be varied by the proportion of carbonated product from the carbonation step and the first desulfiding stripper product used. The partial pressure of carbon dioxide and hydrogen sulfide created by the solution are thereby controlled and held well above that provided by the gas used for stripping. The relatively low flow is economically heated to the 90° C. to 100° C. range increasing the water vapor partial pressure to near maximum and thereby decreasing the gas carbon dioxide and hydrogen sulfide partial pressures. The depleted hydrogen sulfide content with its gas partial pressure reduced essentially to zero is stripped by the increased concentration of carbon dioxide and water vapor that is provided from the decomposition step, and/or the decarbonation step.

A packed or plate tower can be utilized for stripping. By maintaining a sufficient sodium bicarbonate content in the feed solution, a partial pressures of carbon dioxide above one atmosphere is created by the solution in the top of the tower. This also assures maintaining a hydrogen sulfide partial pressure created by the solution above that in the gas so the sodium bicarbonate is utilized primarily to release the hydrogen sulfide and only a small amount is consumed in the release of carbon dioxide.

A portion of the solution containing sodium carbonate and sodium bicarbonate from the first or second stripper can be used directly for final stage scrubbing of sulfur dioxide from flue gas. However, in using this solution directly a high quantity of carbon dioxide is lost due to the high sodium bicarbonate content.

This extra carbon dioxide can be conserved and a sodium carbonate solution provided for the final scrubber by heating a portion of the product from the first or second desulfiding stripper to the 125° C. to 250° C. range under pressure. A holdup time up to 30 minutes may be required depending on the temperature used to allow the sodium bicarbonate time to decompose and release carbon dioxide. Heating can be by indirect steam or by steam injection into a holdup column or tank with the released carbon dioxide and water vapor vented and used for either decarbonation or desulfiding.

The sodium carbonate solution from decomposition or a portion of the solution from the first or second stripper can be used for the final stage of absorption. Makeup sodium carbonate or sodium hydroxide can also be used in the final stage of absorption. Dilution water requirements can also be added at the final stage of absorption to avoid dilution of the decarbonated product containing sodium sulfite that goes to the smelter.

The portion of the solution of sodium carbonate and sodium bicarbonate from the first or second desulfiding stripper that is not decomposed is mixed with the sodium bisulfite solution from the absorber to form sodium sulfite and release carbon dioxide under pressure for use in carbonation. The sodium bisulfite solution can be heated to the 100° C. range to facilitate the reaction releasing the carbon dioxide. Heating requirements can be reduced by providing an excess of sodium bisulfite that remains in solution and facilitates completion of reaction so all the sodium in the sodium carbonate and sodium bicarbonate from stripping is reacted to sodium sulfite.

The presence of 0 to 40% sodium bisulfite in the sodium sulfite used for scrubbing will reduce its scrubbing efficiency, however this can be tolerated when a final scrubbing stage using sodium carbonate solution is utilized. A compressor can also be used to provide desired carbon dioxide carbonation pressure requirements, reduce the decarbonation pressure and increase the amount of carbon dioxide released for pressure carbonation. The sodium bisulfite solution from the absorber can also contain from 0 to 40% sodium sulfite. A high sodium sulfite content improves absorption efficiency.

The preferred embodiments include combining the flows containing sodium carbonate and sodium bicarbonate with the solution containing sodium bisulfite in an inline mixer discharging to a decarbonator as shown on FIG. 2. The carbon dioxide is vented at pressures above 1.2 atmospheres for use in carbonation. Excess carbon dioxide may be vented to the first or second desulfiding scrubber or to the atmosphere.

The sodium sulfite solution is discharged through a reducing valve to another decarbonation chamber which vents carbon dioxide and water vapor at slightly above atmospheric pressure to either the first or second desulfiding scrubber.

The hydrogen sulfide venting from the precarbonator can be oxidized to form sulfur dioxide with the heat used to produce steam. The sulfur dioxide can be used for other purposes or marketed. Conventional methods can also be utilized to oxidize the sulfur dioxide to sulfur trioxide and absorb the sulfur trioxide in a sulfuric acid solution to form high concentrations of sulfuric acid that can be marketed. The vent from this process which contains particulate and sulfur dioxide can be vented to the wet scrubber for particulate removal and to the flue gas scrubber for sulfur dioxide recovery.

THe hydrogen sulfide may also be processed by the conventional Claus reactor where one-third of the hydrogen sulfide is burned and steam is generated forming sulfur dioxide. This sulfur dioxide is reacted with the balance of the hydrogen sulfide with a bauxite or alumina catalyst to recover elemental sulfur. This system may be vented to the smelter for the oxidation of hydrocarbons and to the wet scrubber for particulate removal and the flue gas scrubber for sulfur dioxide recovery.

Portions of the sodium sulfite or sodium bisulfite solutions may also be withdrawn from the decarbonator or flue gas scrubber and marketed or used for the preparation of pulp mill sulfite liquor. The pH used for scrubbing can be varied to meet sulfur removal requirements. Sodium carbonate can be used for high removal requirements or this part of the system can be eliminated where sulfur dioxide restrictions are more tolerant.

A variety of equipment may be utilized in the methods defined in this invention. The precarbonation, stripping without carbonation, carbonation, decomposition, pressure decarbonation, sulfur dioxide absorption and smelting equipment can all be varied to accommodate the methods defined in this invention.

While specific embodiments of the invention concept and operating concentrations and temperatures are set forth herein, it is understood that the invention is not to be construed as limited thereby and that suitable modifications and variations may be made without departing from the spirit and scope of the invention as defined in the appended claims.

What I claim is:

1. An improved method for utilizing a solution containing sodium sulfite to absorb sulfur dioxide from flue gas formed during the burning of sulfur-containing fuels under oxidizing conditions, separating sulfur components from the absorbed sulfur dioxide for recovery, and recycling the sodium sulfite; said method comprising the steps of: (1) burning fuel under reducing conditions to provide sufficient heat to concentrate and smelt a solution containing sodium sulfite, forming a smelt comprised primarily of sodium sulfide and sodium carbonate while releasing sulfur dioxide: (2) dissolving the smelt from step one in water to form a smelt solution; (3) precarbonating the said dissolved smelt solution from step two with a gas comprising of hydrogen sulfide, carbon dioxide and water vapor to convert the sodium sulfide component to sodium hydrosulfide and sodium carbonate, and to convert a portion of the sodium carbonate component to sodium bicarbonate while absorbing a portion of the carbon dioxide thereby reducing the carbon dioxide content in the hydrogen sulfide; (4) separating the gas components by releasing the hydrogen sulfide and contained carbon dioxide from step three for recovery; (5) desulfiding the precarbonated solution from step three by stripping said precarbonated solution with gas containing carbon dioxide and water vapor to reduce the partial pressure of the hydrogen sulfide which is released from the precarbonated solution during desulfiding and raise the temperature of the precarbonated solution by condensation, while reacting the precarbonated solution with a concentrated sodium bicarbonate solution in which the concentration of sodium bicarbonate is maintained sufficiently high to hold the partial pressure of the carbon dioxide created by the reacted concentrated sodium bicarbonate and precarbonated solutions above the partial pressure of the carbon dioxide provided by the gas utilized for stripping during the stripping operation, thereby preventing carbonation or formation of sodium bicarbonate by carbon dioxide absorption during said stripping, while converting the sodium hydrosulfide in said reacted solution to sodium carbonate, forming a solution containing sodium carbonate and sodium bicarbonate and forming and releasing hydrogen sulfide, venting said formed and released hydrogen sulfide and a portion of the carbon dioxide and water vapor used from said stripping for use in step three; (6) pressure carbonating a portion of the solution containing sodium carbonate and sodium bicarbonate from step five with carbon dioxide gas at a pressure above 1.2 atmospheres to convert said portion into a solution containing a high concentration of sodium bicarbonate and recycling at least a portion of the solution with a high concentration of sodium bicarbonate for use in step five; (7) decarbonating the portion of solution containing sodium carbonate and sodium bicarbonate formed in step five and not used in step six by reacting with a sodium bisulfite solution at a pressure above 1.2 atmospheres to form a solution containing sodium sulfite and forming carbon dioxide, utilizing a portion of the solution containing sodium sulfite in step one and releasing the formed carbon dioxide gas at a pressure above 1.2 atmospheres for use in step six; (8) scrubbing flue gas formed in burning sulfur-containing fuels under oxidizing conditions with that portion of the solution containing sodium sulfite formed in step seven and not used in step one, forming a solution containing sodium bisulfite and utilizing a portion of the solution containing sodium bisulfite for decarbonation in step seven.

2. The method of claim 1, wherein the portion of the solution containing sodium bisulfite formed in step eight, not reacted in step seven is concentrated and smelted in step one.

3. The method of claim 1, wherein the pressure carbonation of step six is carried out at sufficiently high carbon dioxide partial pressure to convert at least 75% of the carbonated sodium in the resulting solution to sodium bicarbonate and the amount of resulting solution which is recycled to step five from step six is at least six times the amount of the precarbonated solution from step three which is being reacted.

4. The method set forth in claim 1, wherein a portion of the reacted solution containing sodium carbonate and sodium bicarbonate obtained from stripping in step five, which is decarbonated in step seven, is stripped a second time with carbon dioxide and water vapor before said portion is decarbonated in step seven.

5. The method set forth in claim 1, wherein the portion of the product containing a high concentration of sodium bicarbonate from pressure carbonation in step six that is not reacted in step five is stripped a second time with carbon dioxide and water vapor and the product from said stripping operation is decarbonated in step seven.

6. The method set forth in claim 5, wherein the product sent to the second stripping operation is of sufficiently high concentration of sodium bicarbonate to hold the partial pressure of carbon dioxide created by the concentrated sodium bicarbonate solution above that provided by the gas utilized for stripping during the stripping operation, thereby preventing carbonation or formation of sodium bicarbonate by carbon dioxide absorption during said second stripping.

7. The method of claim 1, wherein a portion of the stripped product from step five containing sodium carbonate and sodium bicarbonate is heated under pressure to above 125° C. to decompose the sodium bicarbonate contained and form sodium carbonate and carbon dioxide, and release carbon dioxide and water vapor for use in step five.

8. The method of claim 7, wherein a solution containing the formed sodium carbonate is reacted with the sulfur dioxide remaining in the flue gas after scrubbing with sodium sulfite in step eight.

9. The method of claim 1, where a portion of the stripped porduct from step five containing sodium carbonate and sodium bicarbonate is heated under pressure to above 125° C. to decompose the sodium bicarbonate contained and form sodium carbonate and carbon dioxide, and carbon dioxide and water vapor are released for use in heating in step seven.

10. The method of claim 9 wherein a solution containing the formed sodium carbonate is reacted with the sulfur dioxide remaining in the flue gas after scrubbing with sodium sulfite in step eight.

11. The method set forth in claim 1, wherein the smelt solution before precarbonating in step three is given a preliminary precarbonation with a limited amount of flue gas containing carbon dioxide, from step eight, to limit the reaction to the conversion of the sodium sulfide contained to sodium hydrosulfide an sodium carbonate, and avoid sodium bicarbonate formation and the release of hydrogen sulfide in the flue gas.

12. The method of claim 1, wherein a portion of the released hydrogen sulfide from step four is oxidized to form sulfide dioxide.

13. The method of claim 1, wherein a portion of the released hydrogen sulfide from step four is oxidized to sulfur trioxide and absorbed in a solution to form sulfuric acid.

14. The method of claim 1, wherein a portion of the released hydrogen sulfide from step four is oxidized to sulfur dioxide and reacted with the remaining portion of hydrogen sulfide to form elemental sulfur.

15. The method of claim 1, wherein sulfur dioxide released in the reduction smelting of said sodium sulfite in step one is vented to and scrubbed with the flue gas formed in burning sulfur containing fuels under oxidizing conditions in step eight to recover the sulfur dioxide.

16. The method set forth in claim 7, wherein a solution containing the said formed sodium carbonate is reacted with sulfur dioxide released in the reduction smelting of said sodium sulfite in step one.

17. The method of claim 1, wherein the decarbonated product from step seven containing sodium sulfite is vented at lower pressures to release carbon dioxide for use in step five.

18. The method of claim 1 wherein a portion of the solution containing sodium carbonate and sodium bicarbonate from step five is reacted with the sulfur dioxide remaining in the flue gas after scrubbing with sodium sulfite in step eight.

19. The method of claim 1 wherein a portion of the sodium sulfite formed in step seven is withdrawn for use in the preparation of pulp mill sulfite liquor or for marketing.

20. The method of claim 1 wherein a portion of the sodium bisulfite formed in step eight is withdrawn for use in the preparation of pulp mill sulfite liquor or for marketing.

* * * * *